United States Patent [19]

Lau

[11] Patent Number: 4,817,691

[45] Date of Patent: Apr. 4, 1989

[54] PROTECTIVE FUEL FILL BIB USING FLEXIBLE SHEET WITH TROUGH SHAPER

[76] Inventor: Kenny M. Lau, 3635 Mission St., San Francisco, Calif. 94110

[21] Appl. No.: 78,800

[22] Filed: Jul. 28, 1987

[51] Int. Cl.$^4$ ............................................. B65B 3/00
[52] U.S. Cl. ...................................... 141/390; 141/86
[58] Field of Search ............... 2/49 R; 141/87, 311 A, 141/316, 333, 334, 338, 370, 372, 286, 390–392, 85–88, 371; 220/85 R, 85 SP, 85 E, 85 F, 86 R

[56] References Cited

U.S. PATENT DOCUMENTS

| | | | |
|---|---|---|---|
| D. 163,509 | 6/1951 | Barr | D12/190 |
| D. 163,926 | 7/1951 | Allen | D12/190 |
| 581,997 | 5/1897 | Clingman | 314/32 |
| 2,467,001 | 4/1949 | Allen | 280/153 B |
| 2,491,791 | 12/1949 | Allen | 280/153 B |
| 2,537,567 | 1/1951 | Allen | 280/153 B |
| 2,538,813 | 1/1951 | Wagner | 141/390 |
| 2,555,868 | 6/1951 | Bowman | 141/86 |
| 2,659,523 | 11/1953 | Comber | 141/390 |
| 3,992,051 | 11/1976 | Hitch | 141/390 X |
| 4,744,482 | 5/1988 | Ohsawa | 220/85 K |

FOREIGN PATENT DOCUMENTS 1367123  6/1964  France .................... 2/49 R

Primary Examiner—Henry J. Recla
Assistant Examiner—Ernest G. Cusick
Attorney, Agent, or Firm—David Pressman

[57] ABSTRACT

An automatic protective fuel fill bib which is capable of protecting an entire fender area adjacent to its fill pipe when an accidental trickling or masssive overflowing of fuel occurs from a fuel-hose nozzle during filling, yet which is so flexible that it can be compacted and stored within a small area of a fill-pipe compartment when not in use. The protective fuel fill bib comprises a super flexible gasoline-resistant rubber sheet (10) with a plastic arc-shaped supported (16) adhered onto the underside of the sheet to influence the sheet to assume a trough shape which will extend itself out and away from the automobile's finish when installed. When fuel is spilled from the fuel-hose nozzle, the fuel will be diverted by the protective fuel fill bib onto the ground without any contact with the automobile's whatsoever (FIG. 4). In lieu of an arc-shaped supporter, the bib can be made to assume the trough shape by means of a ring-shaped supported (FIG. 5), a U-shaped supporter (FIG. 6), a V-shaped supporter (FIG. 7), a W-shaped supporter (FIG. 8), a wire supporter (FIG. 9), a two-flap supporter (FIG. 10), a corner-clip supporter (FIG. 11), a pinching supporter (FIG. 12), and a self shaping material (FIG. 13).

11 Claims, 3 Drawing Sheets

PROTECTIVE FUEL FILL BIB USING FLEXIBLE SHEET WITH TROUGH SHAPER

BACKGROUND

1. Field of the Invention

This invention relates to automobiles, particularly to a protective fuel fill bib that protects an entire fender area adjacent to its fill pipe in case an accidental trickling or massive overflowing of fuel occurs during filling.

2. Description of Prior Art

Today, more people than ever are filling their automobiles themselves to take advantage of the lower prices of "self-service". However, without the service of a skilled, professional service-station attendant, many people spill fuel from the fuel-hose nozzle or fill pipe onto their automobiles' finishes, thus giving their automobiles' finishes both an ugly appearance and a possibly permanent run-mark. This happens even when they are careful about filling, since fuel often surges out of the fill pipe or drips from the nozzle when it is removed from the fill pipe.

Heretofore, a variety of devices have been proposed an implemented for protecting spilling fuel from contacting an automobile's finish.

One such device is shown in U.S. Pat. No. 2,659,523 to Comber, Nov. 17, 1949. Comber suggests the use of a flat, rectangular bib with an aperture having an elaborate mounting device attached around it as a form of seal to prevent fuel from escaping from any gaps around the aperture in the event of a spill, together with a method of mounting the bib onto an automobile's fill pipe. The bib is made of flexible rubber with a raised bead around its edge, supposedly to prevent spillage of easily dripping fuel. However in a spill situation, any overflowing fuel would flow over the raised bead and onto the unprotected portions of the automobile's body. Also, the raised bead decreased the bib's flexibility; thus if it were made large enough to be effective, it would be diffcult to fold and tuck the bib back into the automobile's fill-pipe compartment for convenient storage. Thus the user would have to install and remove the bib on the fill pipe every time it was used.

Another similar device is the fender protector in U.S. Pat. No. 2,538,813 to Wagner, Jan. 28, 1951. The shape of this fender protector can be best described as like a wire hanger having a garment bag-like shield hung on the hanger; the shield was made of a flat and flexible rubber sheet which was impervious to fuel. A user would have to hang this device around an automobile's fill pipe before filling. If this device had been made long enough to cover a fender as suggested and wide enough so that spilling fuel couldn't overflow to either side, it still would not protect the upper half of the fill pipe area. Thus if fuel gushed out of the fuel-hose nozzle, the spill would run behind and down the underside of the fender protector. Also, from the large size of Wagner's design, it is obvious that the user would have to install and remove this device each time fuel was added.

Also, since the above devices were made of a flat and flexible material; they had a tendency to hug the natural body curves of an automobile, so that if a spill occurred, the overflowing fuel would flow naturally with the automobile's contour and onto the unprotected areas of the body. Thus all of these devices were tantamount to useless if a spill occurred.

OBJECTS AND ADVANTAGES

Accordingly, I claim and following objects and advantages of my invention: to provide an automobile protective fuel fill bib that prevents trickling or massive overflowing fuel from a fuel-hose nozzle from contacting an automobile's finish during filling, to provide such a bib in a compact and super flexible form so that it can be folded and tucked into a fill-pipe compartment for convenient out-of-sight storage, to provide such a bib which needs to be instaled only once, and to provide such a bib which does not hug the automobile's body.

Readers will find that further objects and advantages of my invention will become apparent from a consideration of the drawings and ensuing description thereof.

LIST OF REFERENCE NUMERALS

Figure 1:
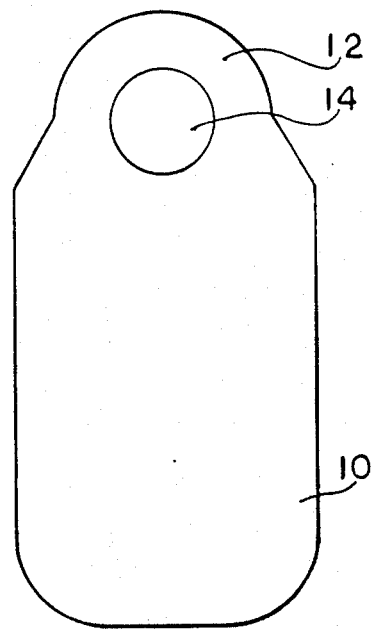
FIG. 1 shows a detailed plan view of a sheet which forms part of a bib according to the invention.

10: sheet
12: narrowed top part
14: hole
16: arc-shaped supportr
18: ring-shaped supporter
20: u-shaped supporter
22: v-shaped supporter
24: w-shaped supporter
26: wire
28: flap
30: mini V-shaped lockjaw clip
32: fill pipe
34: door
36: bottom edge of fill-pipe compartment

DESCRIPTION OF THE PREFERRED EMBODIMENT

My invention comprises a protective fuel fill bib which is curved so that it will divert fuel spills away from the automobile's body, yet which is flexible enough to be easily folded or crumpled after use so that it can be pushed back into the automobile's fill-pipe compartment. The bib comprises a normally flat sheet 10 (FIG. 1) of rubber. A arc-shaped semi-rigid supporter 16 (FIG. 2) is adhered by means of adhesive or a strip of double-sticky sided tape (not shown) onto the underside of the sheet 10 to form sheet 10 into a trough as shown in FIG. 3.

Figure 2:
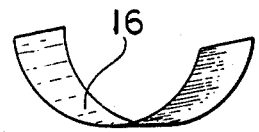
FIG. 2 shows a detailed view of an arc-shaped supporter used on the bib of FIG. 1.

Sheet 10 is cut from a sheet of very thin (approximately 0.8 mm) gasoline-resistant rubber in the shape shown in FIG. 1. Specifically, sheet 10 has a generally rectangular shape with a narrowed top part 12 which has a hole 14 for placement around a fill pipe. Sheet 10 is preferably about 12 cm wide by 24 cm long overall. Narrowed top part 12 is about 9 cm wide by 4.5 cm long and hole 14 is about 3.8 cm in diameter, slightly smaller than the outside diameter of most non-leaded-gasoline fill pipes. Sheet 10 may be colored black, but its color is immaterial since it will rarely be seen, as will be explained.

Arc-shaped supporter 16 is constructed by cutting a plastic annulus or cylinder segment having a width of approximately 4 percent of its circumference in exact increments of 120 degrees. Specifically, an annulus of plastic (virtually any type of plastic that can retain an arc shape after it's cut into segment) 10 cm in diameter, 0.8 mm thick, and 1.3 cm high is cut into three segments. This process yields three such arc-shaped supporters 16 from one such plastic annulus.

Figure 3:
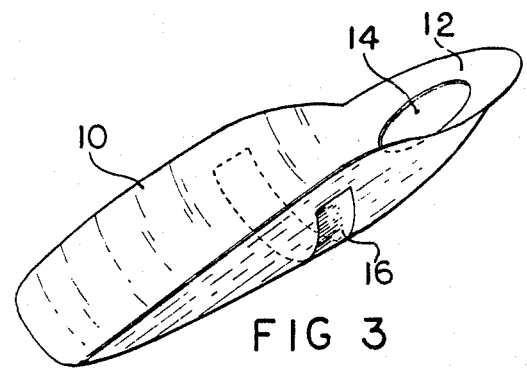
FIG. 3 shows a perspective view of the inventive bib.

The material used for the sheet 10 is naturally limp, but because of its influencing shape, arc-shaped supporter 16 will cause sheet 10 to become a noncollapsible rigid trough, as shown in FIG. 3. Thus when installed on a fill pipe, and when pulled out from within the fill-pipe compartment, it extends itself out and away from an automobile's finish. However it can easily be folded, compressed, or crumpled to a compact shape due to the flexibility of sheet 10 and the narrowness and partial flexibility of supporter 16.

OPERATION—FIGS. 1 TO 4

Figure 4:
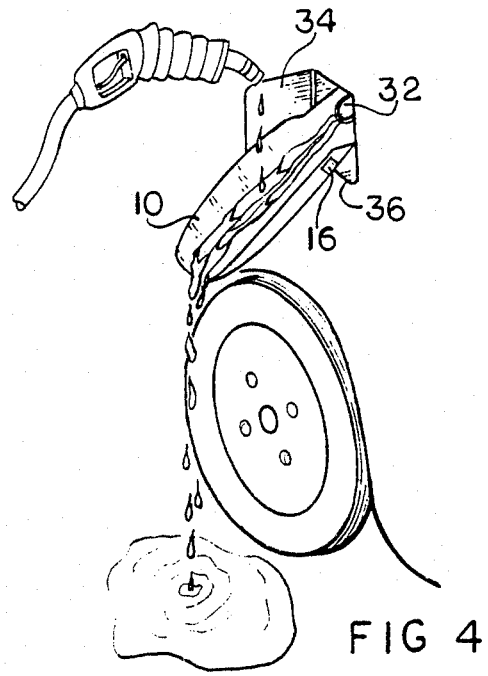
FIG. 4 shows a perspective view of the protective fuel fill bib in use on an automobile.

To install the protective fuel fill bib, hole 14 of sheet 10 (without supporter 16) is stretched over an automobile's fill pipe 32, as shown in FIG. 4. Elastic tension of the rubber secures the bib onto fill pipe 32, but in case of a smaller fill pipe, the bib can be further secured with a tie-strap (not shown). The elasticity of the rubber will enable the bib to be secured to larger fill pipes, including diesel fill pipes. The concave side of supporter 16 is then adhered onto the underside of sheet 10 in a position such that supporter 16 will be tangent to the bottom edge of fill-pipe compartment 36.

The foregoing installation procedure need to be done only once. Once installed, the naturally limp bib can be folded or crumbled and tucked back inside fill-pipe comprtment 36. When door 34 of compartment 36 is closed, the bib will be totally out of sight. When the user decides to add fuel, the bib is pulled out and the naturally limp protective fuel fill bib will be transformed by supporter 16 and gravity into a noncollapsible rigid trough (FIGS. 3 and 4). In the event of a spill during filling, all overflowing fuel (in a massive quantity or not) will be channeled onto the ground without any contact whatsoever with the automobile's finish, as indicated. After the fuel fill is completed, the user again folds or crumples the bib and tucks it back into compartment 36, with supporter 16 positioned such that the concave side is pressed against the fill pipe's lid (not shown), and closes door 34, again hiding the bib.

The protective bib can be used with virtually any automobile, but its most advantageous use is with automobiles that have a fill pipe compartment which has a door that hides the fill pipe.

FIGS. 5 TO 13—ALTERNATIVE BIB CONSTRUCTIONS

The following are alternative bib constructions which can be employed in lieu of the arrangement of FIGS. 1 to 4.

FIG. 5—BIB WITH RING-SHAPED SUPPORTER

Figure 5:
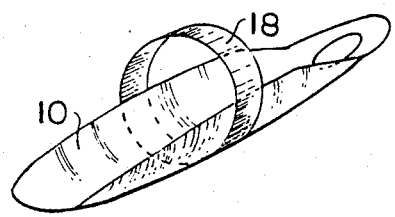
FIG. 5 shows a detailed and perspective view of a bib using a ring-shaped supporter.

As shown in FIG. 5, a ring-shaped supporter 18 is employed to cause sheet 10 to form the trough shape previously described. Supporter 18 is an annulus of virtually any type of resilient material, 10 cm in diameter, 0.8 mm thick, and 1.3 cm high. The attaching procedures are the same as with arc-shaped supporter 16 desribed above.

FIG. 6—BIB WITH U-SHAPED SUPPORTER

Figure 6:
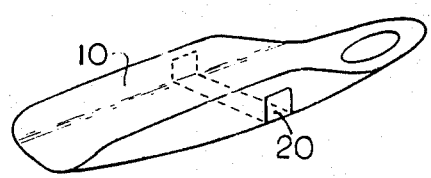
FIG. 6 shows a detailed and perspective view of a bib using a u-shaped supporter.

As shown in FIG. 6, a U-shaped supporter 20 is employed to cause sheet 10 to form a trough shape, similar to that previously described. Supporter 20 is made of virtually any type of resilient material and is approximately 11 cm in linear (flat) length, 0.8 mm thick, and 1.3 cm wide. The two sides of supporter 20 are approximately 2.5 cm tall and are parallel to each other. The attaching procedures are the same as with arc-shaped supporter 16 described above.

FIG. 7—BIB WITH V-SHAPED SUPPORTER

Figure 7:
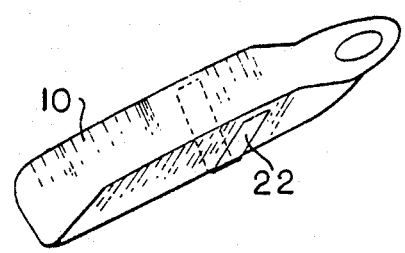
FIG. 7 shows a detailed and perspective view of a bib using a v-shaped supporter.

As shown in FIG. 7, a V-shaped supporter 22 is employed to cause sheet 10 to form a V-shaped trough, similar to that previously described. Supporter 22 is made of virtually any type of resilient material and is approximately the same size flat as supporter 20 of FIG. 6. The two sides of supporter 22 are approximately 150 degrees apart. The attaching procedures are the same as with supporter 16 described above.

FIG. 8—BIB WITH W-SHAPED SUPPORTER

Figure 8:
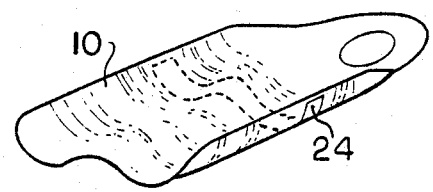
FIG. 8 shows a detailed and perspective view of a bib using a w-shaped supporter.

As shown in FIG. 8, a W-shaped supporter 24 is employed to cause sheet 10 to have a W-shaped cross-section with two concave parallel troughs. Supporter 24 is made of virtually any type of resilient material and is approximately the same size as supporter 20. The bend of the "W" are curved, in approximately the shape of a semicircle and the four segments of the "W" are approximately of equal length. The attaching procedures are the same as with supporter 16 described above.

FIG. 9—BIB WITH WIRE SUPPORTER

Figure 9:
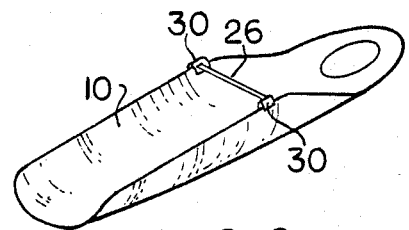
FIG. 9 shows a perspective view of a bib using a wire supporter.

As shown in FIG. 9, a wire 26 is attached to it is opposite side edges so as to pull such edges partly together and thus to cause sheet 10 to form a trough shape, similar to that previously described. Wire 26 is approximately 0.8 mm in diameter and 7.6 cm in length. The two edges of sheet 10 are attached to wire 26 with mini lockjaw clips 30.

FIG. 10—BIB WITH TWO-FLAP SUPPORTER

Figure 10A:
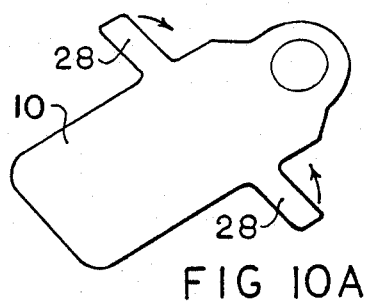
FIG. 10 (parts A and B) show plan and perspective views of a self-supporting bib of the invention.
Figure 10B:
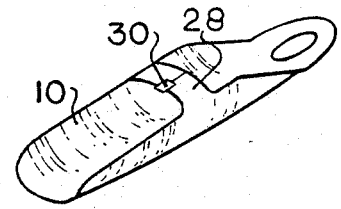

As shown in FIG. 10, two flaps 28 extend out from the opposite side edges of sheet 10 so that when attached together, they will pull the edges partially together and cause sheet 10 to form a trough shape, similar to that previously described. Flaps 28 are approximately 2.5 cm in width and 5 cm in length. Sheet 10 is cut so that the flaps 28 are an integral part thereof. The free ends of flaps 28 are brought together and attached with a mini lockjaw clip 30.

FIG. 11—BIB WITH CORNER-CLIP SUPPORTER

Figure 11A:
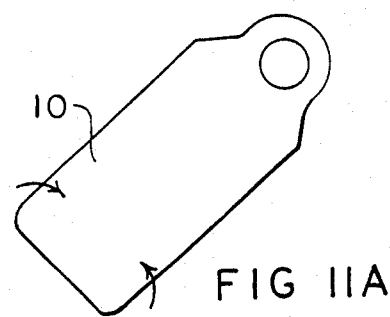
FIG. 11 (parts A and B) show a detailed and plan perspective views of a self-supporting bib of the invention.
Figure 11B:
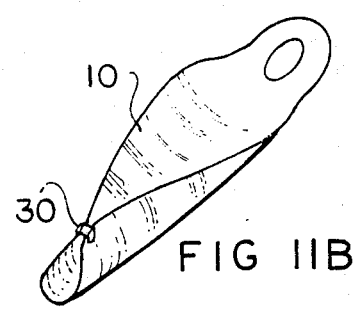

As shown in FIG. 11, the opposite side edges of sheet 10 are brought together and one mini lockjaw clip 30 is employed to hold these edges together and thus cause sheet 10 to form a trough shape, similar to that previously described.

FIG. 12—BIB WITH PINCHING SUPPORTER

Figure 12A:
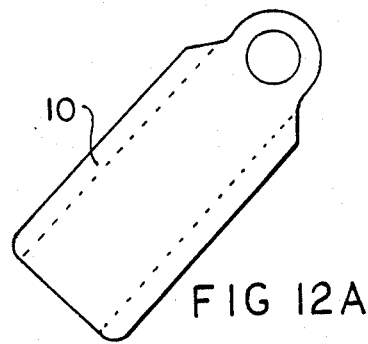
FIG. 12 (parts A and B) show a detailed and perspective views of a further self-supporting bib of the invention.
Figure 12B:
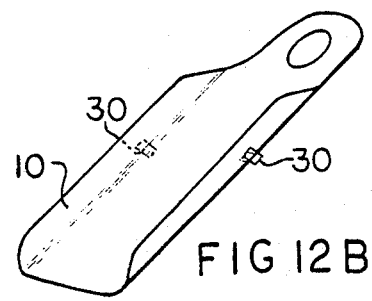

As shown in FIG. 12, two mini lockjaw clips 30 are employed to pinch sheet 10 at two locations spaced in from its opposite edges so as cause sheet 10 to form a trough shape. I.e., mini lockjaw clips 30 will cause edge portions 2.5 cm wide on both side of sheet 10 to fold up and crease so as to shape sheet 10, the creases will be into the trough shape indicated.

FIG. 13—SELF SHAPING BIB

Figure 13:
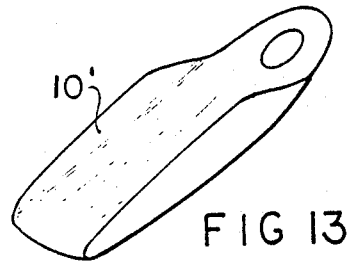
FIG. 13 shows a perspective view of a molded trough-shaped bib of the invention.

As shown in FIG. 13, sheet 10' is molded so that in its relaxed position, it assumes a trough shape previously described. Sheet 10' has the same shape as sheet 10, but is rigid enough to hold itself in the shape indicated, but is flexible and resilient enough to be crumpled or folded back into compartment 36. When pulled out, it will "remember" its natural trough shape.

CONCLUSION AND SCOPE OF INVENTION

The reader will thus see that I have provided a protective fuel fill bib which is capable of protecting an entire fender area adjacent to a fill pipe against an accidental trickling or massive overflowing of fuel from a fuel-hose nozzle during filling, and yet is flexible and compact enough to be folded and tucked within a small area of a fill-pipe compartment for convenient out-of-sight storage when not in use. The user will enjoy the convenience of not having to wash down run-marks caused by fuel spills, and the assurance of a longer lasting and nicer finish. In addition, the bib protects the bottom edge of the fill compartment opening from mechanical damage from the fuel-hose nozzle.

While the above description contains many specificities, these should not be construed as limitations on the scope of the invention, but rather as an exemplification of one preferred embodiment thereof. Those skilled in the art will envision many other possible variations are within its scope. For exmple, skilled artisans will readily be able to change the dimensions and shapes of the various embodiments. They will also be able to make the embodiments with alternative materials, such as aluminum, wood, steel, tin, etc. they will also be able to use various alternatives for mini lockjaw clip 30, such as with a staple, a crimping device, etc. They will also be able to use various alternatives for wire 26, such as fishing line, string, etc. they will also be able to use various methods to extend sheet 10 out and away form an automobile's finish by means other than the devices shown. Accordingly, the scope of the invention should be determined not by the embodiments illustrated, but by the appended claims and their legal equivalents.

I claim:

1. A fuel fill bib for protecting a fender area of an automobile adjacent to its fill pipe in case an accidental trickling to a massive overflow of fuel occurs from said fill pipe or a fuel-hose nozzle during or after filling, and which is compactable so that it can be stored within a fill-pipe compartment when not in use, comprising:
   a single sheet of flexible material having a top edge, two side edges, a bottom edge, and parallel top and bottom surfaces defined by said top, side, and bottom edges,
   said bottom edge of said sheet being a free edge of said sheet,
   said sheet including means for attaching a portion of said sheet, adjacent said top edge, around said fill pipe,
   said sheet having shaping means for causing it to form a self-supporting trough which extends substantially from said portion adjacent said top edge to said free bottom edge such that when said portion adjacent said top edge is attached to said fill pipe, said sheet is extended to its full length, and said bottom surface is placed over and tangent to a bottom edge of the opening of said fill-pipe compartment,
   (a) said bottom edge of said sheet will extend free of and away from said fender area, and
   (b) when said top surface of said sheet is viewed from a direction parallel to and looking into said fill pipe, said side edges of said sheet will be closer to an observer than a middle portion of said sheet between said side edges so as to form said self-supporting trough extending from said fill pipe to said free bottom edge and so that said middle portion of said top side of said sheet will face said observer,
   such that any spillage of fuel from said fill pipe will run down said middle portion of said sheet in the trough formed by said sheet and then off said free bottom edge of said sheet and away from said fender area and to the ground,
   said sheet also being composed of flaccid material which in itself is not rigid enough to be self-supporting or to assume said trough shape and which has sufficient flexibility so that it can be folded or crumpled and tucked completely into said fill-pipe compartment,
   said shaping means comprising a supporter constructed from resilient material of sufficient size to extend the width of said sheet and cause said sheet to assume said trough shape when said sheet is pulled out of said compartment.

2. The protective fuel fill bib of claim 1 wherein said supporter has a curved shape generally like a segment of a circle and has a width of approximately 4 percent of its circumference.

3. The protective fuel fill bib of claim 1 wherein said supporter is made of plastic.

4. The protective fuel fill bib of claim 1 wherein said supporter is U-shaped.

5. The protective fuel fill bib of claim 1 wherein said supporter is V-shaped.

6. The protective fuel fill bib of claim 1 wherein said supporter is W-shaped.

7. A fuel fill bib for protecting a fender area of an automobile adjacent to its fill pipe in case an accidental trickling to a massive overflow of fuel occurs from said pipe or a fuel-hose nozzle during or after filling, and which is compactable so that it can be stored within a fill-pipe compartment when not in use, comprising:
   a single sheet of flexible material having a top edge, two side edges, a bottom edge, and parallel top and bottom surfaces defined by said top, side, and bottom edges, said bottom edge of said sheet being a free edge of said sheet, said sheet including means for attaching a portion of said sheet, adjacent said top edge, around said fill pipe, said sheet having shaping means for causing it to form a self-supporting trough which extends substantially from said portion adjacent said top edge to said free bottom edge such that when said portion adjacent said top edge is attached to said fill pipe, said sheet is extended to its full length, and said bottom surface is placed over and tangent to a bottom edge of the opening of said fill-pipe compartment, (a) said bottom edge of said sheet will extend free of and away from said fender area, and (b) when said top surface of said sheet is viewed from a direction parallel to and looking into said fill pipe, said side edges of said sheet will be closer to an observer than a middle portion of said sheet between said side edges so as to form said self-supporting trough extending from said fill pipe to said free bottom edge and so that said middle portion of said top side of said sheet will face said observer, such that any spillage of fuel from said fill pipe will run down said middle portion of said top side of said sheet in the trough formed by said sheet and then off said free bottom edge of said sheet and away from said fender area and to the ground, said sheet also being composed of flaccid material which in itself is not rigid enough to be self-supporting or to assume said trough shape and which has sufficient flexibility so that it can be folded or crumpled and tucked completely into said fill-pipe compartment, said shaping means comprising a curved, semi-rigid supporter adhered to said bottom surface of said sheet.

8. The protective fuel-fill bib of claim 7 wherein said supporter is ring-shaped.

9. The protective fuel-fill bib of claim 7 wherein said supporter is U-shaped.

10. A fuel fill bib for protecting a fender area of an automobile adjacent to its fill pipe in case an accidental trickling to a massive overflow of fuel occurs from said pipe or a fuel-hose nozzle during or after filling, and which is compactable so that it can be stored with a fill-pipe compartment when not in use, comprising:

a single sheet of flexible material having a top edge, two side edges, a bottom edge, and parallel top and bottom surfaces defined by said top, side, and bottom edges, said bottom edge of said sheet being a free edge of said sheet, said sheet including means for attaching a portion of said sheet, adjacent said top edge, around said fill pipe, said sheet having shaping means for causing it to form a self-supporting trough which extends substantially from said portion adjacent said top edge to said free bottom edge such that when said portion adjacent said top edge is attached to said fill pipe, said sheet is extended to its full length, and said bottom surface is placed over and tangent to a bottom edge of the opening of said fill-pipe compartment, (a) said bottom edge of said sheet will extend free of and away from said fender area, and (b) when said top surface of said sheet is viewed from a direction parallel to and looking into said fill pipe, said side edges of said sheet will be closer to an observer than a middle portion of said sheet between said side edges so as to form said self-supporting trough extending from said fill pipe to said free bottom edge and so that the inside of said middle portion of said trough will face said observer, such that any spillage of fuel from said fill pipe will run down said middle portion of said sheet in the trough formed by said sheet and then off said free bottom edge of said sheet and away from said fender area and to the ground, said sheet also being composed of flaccid material which in itself is not rigid enough to be self-supporting or to assume said trough shape and which has sufficient flexibility so that it can be folded or crumpled and tucked completely into said fill-pipe compartment, said shaping means comprising a V-shaped, semi-rigid supporter adhered to said bottom surface of said sheet.

11. The protective fuel-fill bib of claim 10 wherein said supporter is W-shaped.

* * * * *

UNITED STATES PATENT AND TRADEMARK OFFICE
CERTIFICATE OF CORRECTION

PATENT NO. : 4,817,691
DATED : 1989 Apr 4
INVENTOR(S) : Lau, Kenny M.

It is certified that error appears in the above-identified patent and that said Letters Patent is hereby corrected as shown below:

Abstract: line 9, change "supported" to --supporter--.
line 15, after "automobile's" insert --finish--.
line 18, change "supported" to --supporter--.

Col. 3, line 24, change "segment" to --segments--.

Col. 4, line 55, change "it is" to --its--.

Col. 5, line 58, change "they" to --They--.

Signed and Sealed this

Twenty-fourth Day of October, 1989

Attest:

DONALD J. QUIGG

Attesting Officer

Commissioner of Patents and Trademarks